3,060,081
METHOD OF REPELLING INSECTS WITH SULFOXIDES

Lyle D. Goodhue, Rector P. Louthan, and Roy E. Stansbury, Bartlesville, Okla., assignors to Phillips Petroleum Company, a corporation of Delaware
No Drawing. Filed July 30, 1959, Ser. No. 830,478
31 Claims. (Cl. 167—22)

This invention relates to a method of repelling insects. In one of its aspects, the invention relates to repelling an insect by subjecting the same to an effective quantity of a compound having structural characteristics as indicated by one of the following formulas:

(I)
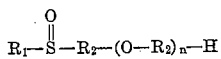

(II)
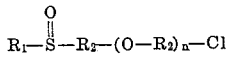

and (III)
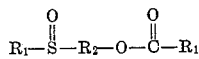

wherein $R_1$ is an alkyl radical of 1–12 carbon atoms, $R_2$ is an alkylene radical of 1–5 carbon atoms, wherein $n$ is an integer in the range 1–2, wherein the $R_1$'s can be different, wherein the $R_2$'s can be different, and wherein the total carbon atoms in all of the R's does not exceed 20. In a further aspect of the invention, it relates to compositions for repelling insects containing as an essential active ingredient therein an effective quantity of one of the sulfoxides of this invention.

It has now been discovered that compounds having structural characteristics, as indicated by the formulas given herein, are effective insect repellents.

Thus, it has been discovered that compounds which can be employed as repellents and which fall within one of the foregoing formulas are:

2-n-butoxyethyl n-octyl sulfoxide
2-isobutoxyethyl n-octyl sulfoxide
2-(2-methoxyethoxy)ethyl n-octyl sulfoxide
2-(2-chloroethoxy)ethyl n-octyl sulfoxide
2-ethoxyethyl n-octyl sulfoxide
3-ethoxypropyl n-octyl sulfoxide
3-propionoxypropyl n-octyl sulfoxide
2-acetoxyethyl n-octyl sulfoxide
n-pentoxymethyl methyl sulfoxide
5-(3-n-butoxypropoxy)pentoxy tert-octyl sulfoxide
methoxymethoxymethyl sec-dodecyl sulfoxide
4-n-propoxypentyl tert-dodecyl sulfoxide
3-methoxybutyl n-hexyl sulfoxide
4-(3-chloropropoxy)butyl n-nonyl sulfoxide
5-(4-chloropentoxy)pentyl n-decyl sulfoxide
4-(2-[3-chloropropoxy]butoxy)butyl ethyl sulfoxide
chloromethoxymethyl sec-decyl sulfoxide
4-(4-chlorobutoxy)butyl n-dodecyl sulfoxide
3-acetoxybutyl n-heptyl sulfoxide
5-caproxypentyl sec-hexyl sulfoxide
3-tridecanoxypropyl n-butyl sulfoxide
capryloxymethoxy n-dodecyl sulfoxide It is an object of this invention to provide a method of repelling an insect. It is a further object of this invention to provide a composition effective for the repelling of insects. It is a further object of this invention to provide a method for repelling houseflies. It is still a further object of this invention to provide a method for repelling roaches. It is a further object of the invention still to provide a method for repelling grain beetles. It is a still further object of this invention to repel ticks, such as dog ticks, winter ticks and Lone Star ticks.

Other aspects, objects, and advantages will be apparent from a study of the disclosure, and the appended claims.

According to the present invention, there is provided a method of repelling an insect which comprises subjecting said insect to the action of at least one compound selected from the compounds which fall within at least one of the formulas given herein. Mixtures of compounds can be used.

The insect repellents of this invention can be applied to surfaces from which said insects are to be repelled in the form of solutions, dusts, emulsions, suspensions, aerosols, and the like, or as the pure compound. When solvents are employed, the compound is dissolved in a material which is non-deleterious with respect to the active insect repellent. Some examples of suitable solvents are acetone, kerosene, naphtha, and other liquid hydrocarbons which normally boil above ambient temperatures. Some specific examples of solid carrier materials which can be employed are talc, kieselguhr, silica gel and the like. When the insect repellents of this invention are applied as aqueous emulsions or dispersions, wetting agents such as alkylated aryl polyether alcohols can be employed.

When the insect repellents of this invention are used in the form of solutions, the lower effective concentration is about 0.1 percent by weight, the upper limit being dictated only by economic considerations. When dusts are employed, a suitable concentration of repellent is from 1 to 20 weight percent although higher or lower amounts can be used if desired.

The insect repellents of this invention are most advantageously applied to surfaces from which insects such as houseflies are to be repelled in the form of a very thin film. In general, 0.01 to 5 grams of one of the repellents is deposited on each square foot of a particular surface. In most cases, a preferred range of from 0.1 to 3.0 grams per square foot are deposited. One skilled in the art can apply his skill to establish the concentrations and rates of application best suited to his purpose.

A particularly advantageous method for applying the repellents of this invention to the desired surfaces is in the form of a wettable powder. An example of a suitable wettable powder can be made up by dissolving 25 parts by weight of one of the sulfoxides of this invention in acetone, adding 2 parts by weight of a wetting agent, stirring in 73 parts by weight of a finely divided attapulgite, and evaporating off the acetone. The resulting dried powder can be employed for repelling insects by dispersing a desired amount of this powder in water and spraying this dispersion onto the desired surface. In this light, some of the repellents of this invention exhibit certain surface active properties of their own. For example, 3-propionoxypropyl n-octyl sulfoxide has sufficient water solubility to act as a surface active agent.

The repellents of this invention are particularly applicable for repelling houseflies, roaches, and grain beetles. In utilizing these repellents, it is within the scope of this invention to combine these sulfoxides with such pyrethrum synergists as N-(2-ethylhexyl)bicyclo[2.2.1]-5-heptene-2,3-dicarboximide, and the like. These sulfoxide repellents can also be formulated with other known repellents such as 2,3,4,5-bis($\Delta^2$-butenylene)tetrahydrofurfural, the di-n-propyl ester of pyridine-2,5-dicarboxylic acid and the like.

Various methods of synthesizing the sulfoxides of this invention can be employed. For example, n-butoxyethyl n-octyl sulfoxide can be prepared by reacting n-butyl vinyl ether with n-octyl mercaptan in the presence of ultraviolet light, and thereafter oxidizing the thus-formed sulfide to the sulfoxide by means of hydrogen peroxide. Such compounds as 2-acetoxyethyl n-octyl sulfoxide can be prepared by reacting vinyl acetate with n-octyl mercaptan to form a sulfide, and thereafter oxidizing this sulfide to the sulfoxide in the manner described above. Another route for synthesizing this compound is to esterify 2-hydroxyethyl n-octyl sulfoxide with acetic acid in the presence of a mineral acid catalyst.

EXAMPLE I

A series of runs were carried out in which various sulfoxides of the above formulas were tested as repellents for houseflies.

These tests were carried out in the following manner. Two strips of molasses were painted on a 2½" x 4¼" card. The strips were about ¼" wide and ran lengthwise on the card about ½" from the side. The cards were then placed in an oven at 170° F. for four hours to harden the molasses.

Strips of porous lens paper, 1" wide by 5" long, were then dipped into an acetone solution of the chemical to be tested, said solution containing either 0.5 or 1.0 weight percent of the chemical to be tested. The strips were then allowed to dry for 2 to 3 hours, after which they were stapled over the molasses strips. The cards were then mounted in a cage containing several hundred hungry houseflies of over five days old. The number of flies feeding on the strip are counted at five and fifteen minutes, and every fifteen minutes thereafter for 2½ hours. In cases where the material is non-repellent, the flies quickly consume all of the molasses, often within 45 minutes. The results of these tests are expressed below as Table I.

*Table I*

| Compound Tested—Sulfoxides | Concentration of Dipping Solution, Wt. Percent | Number of Flies Feeding at Indicated Time (Min.) | | | | | | | | | Percent of Molasses Remaining (Est.) After Starving Flies Overnight |
|---|---|---|---|---|---|---|---|---|---|---|---|
| | | 5 | 15 | 30 | 45 | 60 | 90 | 120 | 150 | 165 | |
| 2-n-butoxyethyl n-octyl | 0.5 | 0 | 1 | 1 | 0 | 0 | 2 | 0 | 0 | 0 | 25. |
| 2-isobutoxyethyl n-octyl | 0.5 | 0 | 0 | 0 | 0 | 0 | 0 | 0 | 0 | 0 | 20. |
| 2-(2-chloroethoxy)ethyl n-octyl | 0.5 | 0 | 0 | 2 | 0 | 1 | 13 | 2 | 0 | 3 | Not Estimated. |
| 2-ethoxyethyl n-octyl | 0.5 | 0 | 0 | 1 | 0 | 0 | 0 | 0 | 0 | 0 | Do. |
| 3-ethoxypropyl n-octyl | 0.5 | 0 | 1 | 2 | 1 | 1 | 0 | 0 | 0 | 0 | Do. |
| 3-propionoxypropyl n-octyl | 1.0 | 0 | 2 | 1 | 1 | 1 | 1 | 0 | 1 | 0 | Do. |
| 2-acetoxyethyl n-octyl | 0.5 | 5 | 7 | 3 | 2 | 3 | 15 | 3 | 12 | 15 | Do. |

EXAMPLE II

A number of runs were made in which some of the sulfoxides of the present invention were tested for repellency to the American roach. In these runs, an apparatus was used which was made from three 4" by 4" glass cylinders with U-shaped opening to allow free passage of the roaches to any of the cylinders. The three cylinders with openings coinciding were taped together and placed on a piece of window glass to form a bottom. Filter papers were slipped under each cylinder, and 5 roaches were introduced into the cylinders in the evening before the test was to start in the morning so as to give them a chance to become accustomed to new quarters. On the day prior to testing 11 centimeters diameter filter papers (Whatman No. 40) were dipped in acetone solutions containing 5 percent of the sulfoxide to be tested. At the begining of the test, the dried, chemically treated papers were substituted for the untreated papers under the outer two cylinders, and a clean untreated paper was placed under the center cylinder. After one hour, readings were taken on the number of roaches on each treated paper and the number on the untreated paper. The roaches were then stirred to force them to again choose the least objectionable paper. This reading and stirring process was done each hour until 6 hours had elapsed from the beginning of the test. The following day, two readings were taken, 6 hours apart. At the end of the test, the results were recorded as the sum of the number of roaches on each treated paper. Since eight readings were taken in all, and 5 roaches were present during each test, the maximum number which can be reported for a run is 40. Since three papers are present, two of which are treated, the statistical average for treated papers, if the material is neither repellent or attractive, is 27.

*Table II*

| Compound employed: | Total roaches on chemical |
|---|---|
| 2-n-butoxyethyl n-octyl sulfoxide | 4 |
| 2-isobutoxyethyl n-octyl sulfoxide | 6 |
| 2-(2-methoxyethoxy)ethyl n-octyl sulfoxide | 9 |
| 2-ethoxyethyl n-octyl sulfoxide | 12 |
| 3-ethoxypropyl n-octyl sulfoxide | 10 |
| 3-propionoxypropyl n-octyl sulfoxide | 11 |

EXAMPLE III

Several of the sulfoxides of this invention were tested as repellents for grain beetles. The procedure of these tests is the same as that given by Laudani et al. in Journal of Economic Entomology, volume 47, 1104–1107 (1954). Briefly, the procedure comprises fitting 12 one-pint ice cream cartons into holes cut in a 20" diameter circle or ¾" plywood, the periphery of which is enclosed with a 2" metal rim. Treated and untreated grain is introduced into the cartons, and the entire apparatus is covered with a lid. Several hundred grain beetles are introduced into the apparatus by means of a small hole in the center of the lid. After approximately 48 hours, the lid is removed, and the individual cartons of grain are inspected to determine if the treated grain contains fewer beetles than the untreated grain. From the ratio of beetles in the treated grain to the untreated grain, the percent repellency retained is calculated. The results of these tests are given below in Table III.

*Table III*

| Sulfoxide employed: | Percent repellency |
|---|---|
| 2-n-butoxyethyl n-octyl sulfoxide | 98 |
| 2-isobutoxyethyl n-octyl sulfoxide | 89 |
| 2-(2-methoxyethoxy)ethyl n-octyl sulfoxide | 97 |
| 2-ethoxyethyl n-octyl sulfoxide | 63 |

EXAMPLE IV

One of the sulfoxides of this invention, 2-n-butoxyethyl n-octyl sulfoxide, is applied to clothing which is then worn in an area heavily infested with Lone Star ticks. Complete repellency to these ticks is realized for a period of greater than three months.

It can be seen that the sulfoxides of this invention are also applicable for repelling Lone Star ticks. These new repellents are also useful in repelling other varieties of ticks such as dog ticks, winter ticks and the like.

Reasonable variation and modification are possible within the scope of the foregoing disclosure and the appended claims to the invention, the essence of which is that certain selected sulfoxides which can be grouped as herein into at least one of the formulas given above have been found to possess good repellency toward insects, as described.

We claim:
1. A method for repelling an insect which comprises subjecting said insect to the action of at least one compound selected from the group consisting of compounds having the following formulas:

(I)
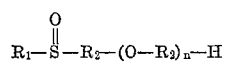

(II)
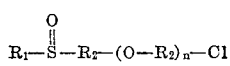

and (III)
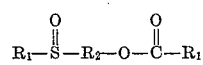

wherein $R_1$ is an alkyl radical of 1–12 carbon atoms, $R_2$ is an alkylene radical of 1–5 carbon atoms, wherein $n$ is an integer in the range 1–2, wherein the $R_1$'s can be different, wherein the $R_2$'s can be different, and wherein the total carbon atoms in all of the R's does not exceed 20.

2. A composition for repelling an insect which comprises a compound selected from the group consisting of compounds having Formulas I, II and III, said compound being dispersed in a repellent adjuvant dispersant.

3. A method for repelling an insect which comprises subjecting said insect to the action of a compound having the following structural characteristics:

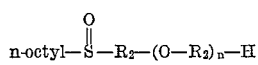

wherein $R_2$ is an alkylene radical of 1–5 carbon atoms, $n$ is an integer in the range 1–2, the $R_2$'s can be different, and wherein the total carbon atoms in the R's does not exceed 20.

4. A method for repelling an insect which comprises subjecting said insect to the action of a compound having the following structural characteristics:

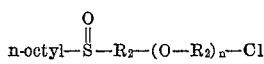

wherein $R_2$ is an alkylene radical of 1–5 carbon atoms, $n$ is an integer in the range 1–2, the $R_2$'s can be different, and wherein the total carbon atoms in the R's does not exceed 20.

5. A method for repelling an insect which comprises subjecting said insect to the action of a compound having the following structural characteristics:

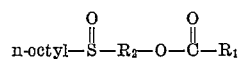

wherein $R_1$ is an alkyl radical of 1–12 carbon atoms, $R_2$ is an alkylene radical of 1–5 carbon atoms, $n$ is an integer in the range 1–2, and the total carbon atoms in the R's does not exceed 20.

6. A method of repelling houseflies which comprises subjecting said flies to the action of 2-n-butoxyethyl n-octyl sulfoxide.

7. A method of repelling houseflies which comprises subjecting said flies to the action of 2-isobutoxyethyl n-octyl sulfoxide.

8. A method of repelling houseflies which comprises subjecting said flies to the action of 2-(2-chloroethoxy) ethyl n-octyl sulfoxide.

9. A method of repelling houseflies which comprises subjecting said flies to the action of 2-ethoxyethyl n-octyl sulfoxide.

10. A method of repelling houseflies which comprises subjecting said flies to the action of 2-ethoxypropyl n-octyl sulfoxide.

11. A method of repelling houseflies which comprises subjecting said flies to the action of 3-propionoxypropyl n-octyl sulfoxide.

12. A method of repelling houseflies which comprises subjecting said flies to the action of 2-acetoxyethyl n-octyl sulfoxide.

13. A method of repelling roaches which comprises subjecting said roaches to the action of 2-n-butoxyethyl n-octyl sulfoxide.

14. A method of repelling roaches which comprises subjecting said roaches to the action of 2-isobutoxyethyl n-octyl sulfoxide.

15. A method of repelling roaches which comprises subjecting said roaches to the action of 2-(2-methoxyethoxy)ethyl n-octyl sulfoxide.

16. A method of repelling roaches which comprises subjecting said roaches to the action of 2-(2-chloroethoxy) ethyl n-octyl sulfoxide.

17. A method of repelling roaches which comprises subjecting said roaches to the action of 2-ethoxyethyl n-octyl sulfoxide.

18. A method of repelling roaches which comprises subjecting said roaches to the action of 3-ethoxypropyl n-octyl sulfoxide.

19. A method of repelling roaches which comprises subjecting said roaches to the action of 3-propionoxypropyl n-octyl sulfoxide.

20. A method of repelling grain beetles which comprises subjecting said beetles to the action of 2-n-butoxyethyl n-octyl sulfoxide.

21. A method of repelling grain beetles which comprises subjecting said beetles to the action of 2-(2-methoxyethoxy)ethyl n-octyl sulfoxide.

22. A method of repelling grain beetles which comprises subjecting said beetles to the action of 2-ethoxyethyl n-octyl sulfoxide.

23. A method of repelling grain beetles which comprises subjecting said beetles to the action of 2-isobutoxyethyl n-octyl sulfoxide.

24. A method of rendering clothing repellent to ticks which comprises applying to said clothing 2-n-butoxyethyl n-octyl sulfoxide.

25. A method of rendering clothing insect repellent which comprises applying thereto a compound of claim 1.

26. A method of repelling roaches which comprises subjecting said roaches to the action of a compound of claim 1.

27. A method of repelling grain beetles which comprises subjecting said beetles to the action of a compound of claim 1.

28. A method according to claim 1 wherein the insect repelled is houseflies.

29. A method according to claim 1 wherein the insect repelled is ticks.

30. A method according to claim 1 wherein the insect repelled is roaches.

31. A method according to claim 1 wherein the insect repelled is grain beetles.

References Cited in the file of this patent

UNITED STATES PATENTS

| | | |
|---|---|---|
| 1,986,218 | Remy | Jan. 1, 1935 |
| 2,043,941 | Williams | June 9, 1936 |
| 2,045,925 | Remy | June 30, 1946 |
| 2,926,118 | Mahan | Feb. 23, 1960 |
| 2,944,932 | Stansbury et al. | July 12, 1960 |
| 2,957,799 | Goodhue et al. | Oct. 12, 1960 |

OTHER REFERENCES

U.S.D.A. Bulletin No. E–585, January 1943, pp. 1, 11.
U.S.D.A. Circular No. 523, May 1939, pp. 1, 2, 3, 6.
Jones, 649 O.G. 603, August 14, 1951.